United States Patent
Brown et al.

(10) Patent No.: US 7,394,893 B2
(45) Date of Patent: Jul. 1, 2008

(54) ORIGIN DEVICE ORDER BILLING ACCORDING TO CALLER

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 11/158,884

(22) Filed: Jun. 22, 2005

(65) Prior Publication Data

US 2005/0238151 A1 Oct. 27, 2005

Related U.S. Application Data

(62) Division of application No. 10/023,408, filed on Dec. 17, 2001, now Pat. No. 6,956,935.

(51) Int. Cl.
*H04M 15/00* (2006.01)
(52) U.S. Cl. .............................. 379/114.21; 379/114.01; 379/114.27; 379/127.03; 379/127.05
(58) Field of Classification Search ............ 379/114.01, 379/114.03, 114.05, 114.15, 114.19, 114.21, 379/114.22, 114.23, 114.24, 127.03, 127.04, 379/127.05, 223; 705/26, 39, 40
See application file for complete search history.

(56) References Cited

U.S. PATENT DOCUMENTS

| | | | |
|---|---|---|---|
| 4,953,204 A | 8/1990 | Cuschleg, Jr. et al. | 379/266 |
| 5,014,298 A | 5/1991 | Katz | 379/93 |
| 5,311,574 A | 5/1994 | Livanos | 379/88 |
| 5,381,467 A | 1/1995 | Rosinski et al. | 379/121.02 |
| 5,444,774 A | 8/1995 | Friedes | 379/266 |
| 5,499,288 A | 3/1996 | Hunt et al. | 379/88.02 |
| 5,561,707 A | 10/1996 | Katz | 379/88 |
| 5,572,587 A | 11/1996 | Gaglani | 379/266 |
| 5,602,907 A | 2/1997 | Hata et al. | 379/114.22 |
| 5,673,404 A | 9/1997 | Cousins et al. | 395/809 |
| 5,790,637 A | 8/1998 | Johnson et al. | 379/88.04 |
| 5,822,411 A | 10/1998 | Swale et al. | 379/114.22 |
| 5,859,900 A | 1/1999 | Bauer et al. | 379/114.21 |

(Continued)

FOREIGN PATENT DOCUMENTS

EP 0585004 A2 * 3/1994

(Continued)

*Primary Examiner*—Quoc Tran
(74) *Attorney, Agent, or Firm*—Matthew B. Talpis; Amy J. Pattillo

(57) ABSTRACT

A method, system, and program for billing for order places from an origin device according to the current caller billing plan are provided. A billing plan associated with an authenticated caller identity of a caller using an origin device is accessed by a vendor order center during a call placed to the vendor order center. At least one account provider is specified in the billing plan. A selection of one from among multiple account providers is specified for the order. The caller then authorizes the order and a bill for the order is transferred according to the authenticated caller identifier and the authorization for the account provider selection, such that the vendor order center is enabled to bill for the order with limited authenticated account information.

16 Claims, 7 Drawing Sheets

U.S. PATENT DOCUMENTS

| | | | |
|---|---|---|---|
| 5,864,617 A | 1/1999 | Donnelly | 379/266 |
| 5,867,572 A | 2/1999 | MacDonald et al. | 379/266 |
| 5,872,834 A | 2/1999 | Teitelbaum | 379/93.03 |
| 5,903,642 A | 5/1999 | Schwartz et al. | 379/309 |
| 5,905,793 A | 5/1999 | Flockhart et al. | 379/266 |
| 5,915,001 A | 6/1999 | Uppaluru | 379/88.22 |
| 5,937,044 A | 8/1999 | Kim | 379/121.05 |
| 5,940,476 A | 8/1999 | Morganstein et al. | 379/88.02 |
| 5,946,386 A | 8/1999 | Rogers et al. | 379/265.09 |
| 5,946,654 A | 8/1999 | Newman et al. | 704/246 |
| 5,978,467 A | 11/1999 | Walker et al. | 379/266 |
| 6,038,305 A | 3/2000 | McAllister et al. | 379/201.02 |
| 6,049,603 A | 4/2000 | Schwartz et al. | 379/309 |
| 6,058,364 A | 5/2000 | Goldberg et al. | 704/55 |
| 6,064,730 A | 5/2000 | Ginsberg | 379/265.09 |
| 6,101,242 A | 8/2000 | McAllister et al. | 379/88.02 |
| 6,122,357 A | 9/2000 | Farris et al. | 379/207 |
| 6,125,178 A | 9/2000 | Walker et al. | 379/211.01 |
| 6,178,230 B1 | 1/2001 | Borland | 379/67.1 |
| 6,195,419 B1 | 2/2001 | Gilboy | 379/114.19 |
| 6,236,722 B1 | 5/2001 | Gilbert et al. | 379/230 |
| 6,263,066 B1 | 7/2001 | Shtivelman et al. | 379/266 |
| 6,282,274 B1 * | 8/2001 | Jain et al. | 379/114.26 |
| 6,327,346 B1 | 12/2001 | Infosino | 379/88.02 |
| 6,381,317 B1 | 4/2002 | Bala et al. | 379/114.23 |
| 6,381,329 B1 | 4/2002 | Uppaluru et al. | 379/266.04 |
| 6,522,743 B1 | 2/2003 | Hurd | 379/266.04 |
| 6,535,492 B2 | 3/2003 | Shtivelman | 370/270 |
| 6,542,590 B1 * | 4/2003 | Player et al. | 379/114.26 |
| 6,639,977 B1 | 10/2003 | Swope et al. | 379/114.21 |
| 6,768,792 B2 | 7/2004 | Brown | |
| 6,792,102 B2 | 9/2004 | Shires | |
| 6,826,173 B1 | 11/2004 | Kung et al. | 370/352 |
| 6,826,276 B2 | 11/2004 | Brown et al. | 379/265.02 |
| 6,842,767 B1 | 1/2005 | Partovi et al. | 709/203 |
| 6,845,155 B2 | 1/2005 | Elsey | 379/266.04 |
| 6,917,672 B2 | 7/2005 | Brown | |
| 6,959,081 B2 | 10/2005 | Brown | |
| 6,977,998 B2 | 12/2005 | Brown | |
| 6,996,216 B2 | 2/2006 | Brown | |
| 7,076,041 B2 | 7/2006 | Brown | |
| 7,076,051 B2 | 7/2006 | Brown | |
| 7,092,508 B2 | 8/2006 | Brown | |
| 7,095,835 B2 | 8/2006 | Brown | |
| 7,095,842 B2 | 8/2006 | Brown | |
| 7,103,172 B2 | 9/2006 | Brown | |
| 7,130,411 B2 | 10/2006 | Brown | |
| 7,139,390 B2 | 11/2006 | Brown | |
| 7,149,296 B2 | 12/2006 | Brown et al. | |
| 7,200,215 B2 | 4/2007 | Brown | |
| 7,215,759 B2 | 5/2007 | Brown et al. | |
| 7,245,716 B2 | 7/2007 | Brown | |
| 2003/0108163 A1 | 6/2003 | Brown et al. | 379/88.01 |
| 2003/0114139 A1 | 6/2003 | Brown et al. | 455/406 |
| 2003/0114142 A1 | 6/2003 | Brown et al. | 455/408 |
| 2003/0115138 A1 | 6/2003 | Brown et al. | 705/40 |
| 2005/0238146 A1 | 10/2005 | Brown | |
| 2005/0238163 A1 | 10/2005 | Brown | |

FOREIGN PATENT DOCUMENTS

| | | |
|---|---|---|
| EP | 0676882 A2 | 10/1995 |
| JP | 8139797 A | 5/1996 |
| JP | 10294784 A | 11/1998 |

* cited by examiner

ORIGIN DEVICE ORDER BILLING ACCORDING TO CALLER

CROSS-REFERENCE TO RELATED APPLICATIONS

This application is a divisional of commonly assigned U.S. patent application Ser. No. 10/023,408, filed Dec. 17, 2001 now U.S. Pat. No. 6,956,935, titled "Origin Device Billing According to Caller", which is hereby incorporated herein by reference.

BACKGROUND OF THE INVENTION

1. Technical Field

The present invention relates in general to telecommunications and, in particular, to voice identification. Still more particularly, the present invention relates to billing for telephone based order transactions initiated from an origin device according to the billing plan of the caller utilizing the device.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

Today, the public switching telephone network (PSTN), wireless networks, and private networks telephone services are based on the identification of the wireless telephone or wireline that a calling party uses. Services are personalized according to wireless telephone or wireline telephone number, where services associated with one telephone number are not accessible for another telephone number assigned to the same subscriber. For example, there is typically a first set of service features and billing options assigned to a home line number, a second set of service features and billing options assigned to an office line number, and a third set of service features and billing options assigned to a cellular telephone number. The networks process calls to and from each of these different subscriber telephones based on a separate telephone number.

One problem occurs where multiple people utilize a single wireless or wireline telephone number for making calls. Only one set of services is provided to the number, regardless of who is actually making the call. Therefore, callers are limited to the services selected by the subscriber.

In addition, where multiple people utilize a single wireless or wireline telephone number for making calls, the subscriber of the line is billed for use of the line. For example, an audio redial service that automatically redials the number last called, may be billed per use of the service to the subscriber.

A limited way in which the person billed for a service may be supplemented is when a caller utilizes a calling card to access a long distance service provider to receive long distance service. The caller pays for the cost of the long distance service through pre-paid or post-paid minutes or other billing plans. However, where a billing plan for a wireless or wireline subscriber bills by the minute for use of a line, the subscriber is still paying for the other caller's use of the line to access a long distance service provider and make the call. Further, the caller ID that is transferred with the long distance call is still the caller ID of the subscriber line, rather than the caller ID of the individual making the long distance call.

When placing orders for products or services over the telephone, a caller typically provides a business with a credit card number or banking account number from which payment for the product or service may be received. Some businesses may assign an identification number or user name and password to individuals and store credit card numbers in association with the identification number or user name and password. However, such programs are limited because the individual has to yield personal account information to a company that is accessible to employees working at that company. In addition, such programs are limited because the individual must supply personal and billing information to each individual company and keep track of identification numbers for each company.

Therefore, in view of the foregoing, it would be advantageous to provide a method, system, and program for specifying services available at a device utilized to place a call according to a particular caller, where multiple callers may utilize the device. In addition, it would be advantageous to provide a method, system, and program for billing for the use of a line and the services provided thereto according to caller, rather than according to the line subscriber, such that a caller's billing plan follows the caller to multiple devices. Further, it would be advantageous to bill for orders initiated via telephone utilizing a single caller identifier, such that the caller's financial information is not distributed to a company, but the company may access payment from the caller according to the single caller identifier.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for billing for telephone based order transactions initiated from an origin device according to the billing plan of the caller utilizing the device.

According to one aspect of the present invention, a trusted telephone network, including at least one service provider, receives a request for service from an origin device. The origin device is associated with a line number to be billed according to a subscriber billing plan. An identity of a caller requesting the service from the origin device is authenticated. Then, a billing plan associated with the authenticated caller identity is accessed and utilized to replace or supplement the subscriber billing plan, such that billing for service provided at an origin device is specified according to the caller currently utilizing the origin device.

According to another aspect of the present invention, a vendor order center receives the billing plan for the authenticated caller identifier of the caller during a call placed to the vendor order center. At least one account provider is specified in the billing plan. A selection of one from among multiple account providers is specified for the order. The caller then authorizes the order and a bill for the order is transferred according to the authenticated caller identifier and the authorization for the account provider selection, such that the vendor order center is enabled to bill for the order with limited authenticated account information. In particular, when the bill is transferred, the bill may be transferred directly to the selected account provider or the bill may be transferred to a billing service enabled to negotiate payment from the selected account provider to the vendor order center.

The account provider may include, for example, a credit account provider, a debit account provider, and a savings account provider. The account provider may be specified by the context of the call. Further, a default account provider may be designated such that the selection of account provider is adjusted only if the caller specifically requests another account provider.

The authenticated caller identifier may include a caller name. The authorization by a caller may include a keypad authorization entry, a voice authorization entry, and a touch selection authorization entry.

The vendor order center may be implemented in a single terminal. Alternatively, the vendor order center may include a call center enabled with an interactive voice recognition unit for facilitating order placement, or a call center managing multiple representatives.

According to yet another aspect of the present invention, an account provider receives a bill for an order placed via a telephone call, wherein the billed party is identified by a voice authenticated identifier. The account provider provides payment for the bill from an account managed according to the voice authenticated identifier. In particular, the bill may be received from a secure billing service negotiating payment from the billed party to a vendor or from a vendor order center.

According to a further aspect of the present invention, a billing service may receive a bill for an order placed by multiple callers via a telephone call, wherein the multiple callers split the cost of the bill and are each identified by a unique voice authenticated identifier. The billing service facilitates payment of the bill from multiple account providers according to the voice authenticated identifiers. Then, providing a single payment transaction for the bill with the billing party.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
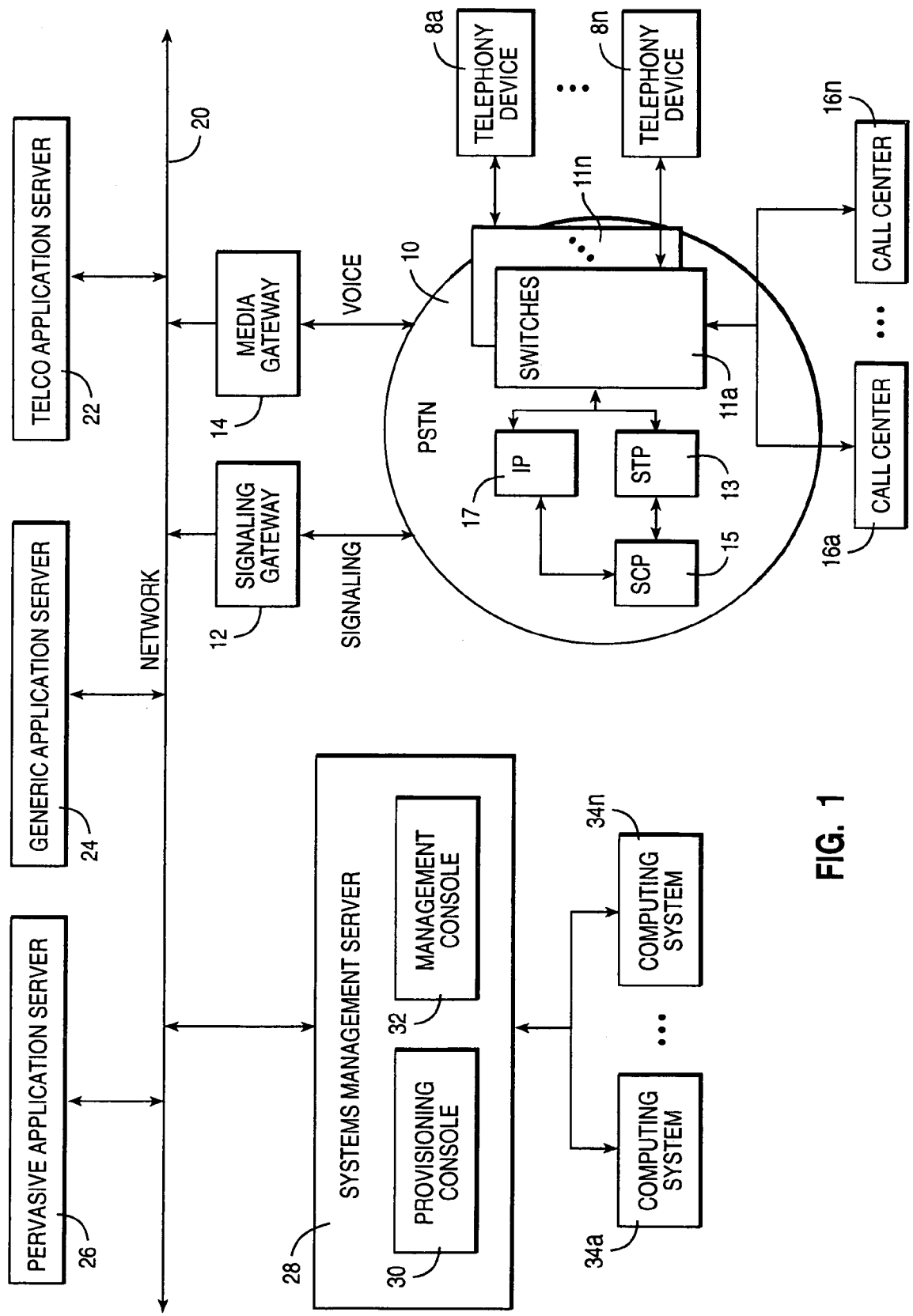
FIG. 1 depicts a block diagram of a network environment in which the present invention may be implemented.

A method, system, and program for billing for telephone transactions provided at an origin device according to the billing plan of the caller currently utilizing the device are provided.

For purposes of the present invention, telephone transactions may include telephone and generic services available from within a trusted telephone network and telephone and generic services available from servers functioning outside the trusted telephone network, as will be further described. Telephone service preferably includes the basic service of connecting a voice and signal channel between an origin device and a destination device. Generic services preferably include call services, such as call forwarding, call waiting, and long distance calling. In addition, generic services may include financial services, database management services, and other services accessible via a call.

In addition, telephone transactions may include orders initiated via a telephone. Preferably, a caller billing plan includes at least one account provider to which a charge for an order may be placed. In addition, a caller billing plan may include shipping addresses, billing addresses, and other distribution information.

First, an identity of a caller utilizing the origin device is authenticated. Caller identity authentication may be initiated by the origin device originating the call, the intermediary device processing the call, or the destination device receiving the call. In addition, each of the devices may access a third party or external server to perform the caller identity authentication. Performance of caller identity authentication has different advantages depending on the device initiating the caller identity authentication.

While in the present invention, authentication of a caller identity is described with emphasis placed on voice authentication, other methods of caller identity authentication may also be performed. Voice samples utilized for voice authentication are just one of multiple types of biometric sampling. For example, a caller may locally provide an eye scan, a fingerprint, and other biophysical identifiers that are transmitted within or outside the trusted network to authenticate the identity of the caller. Alternatively, keypad entries, such as a pin code, account number, password, or other secure transaction key may be entered by a caller and utilized to authenticate the identity of the caller.

Next, a caller profile is accessed according to the authenticated identity of the caller utilizing the origin device. The caller profile includes a billing plan and services requested by the caller. The caller profile may be accessed from a service provider within the trusted telephone network and/or from external servers functioning outside the trusted telephone network, where the caller has selected to disclose caller profile information at those external servers.

A call placed at the origin device is then processed according to the services and billing plan of the caller. Advantageously, by specifying the billing for use of an origin device according to the caller utilizing the device, rather than the line subscriber, additional services may be provided for the call and the caller may be billed for any charges associated with use of the line, rather than the subscriber.

In particular, where a wireless telephone line is utilized, billing is typically performed by the minute. According to the present invention, the caller utilizing the wireless telephone line device will be billed for the minutes utilized and for the services provided, rather than billing the wireless telephone line subscriber for those minutes utilized by the caller. The same billing advantage may also be applied to long distance service.

For purposes of the present invention, a caller preferably subscribes to a telephone service from at least one service provider. That service may be linked to a particular line number, but advantageously the service follows the caller to whatever telephone device the caller chooses to utilize. The service may include in a billing plan that provides for services in addition to basic telephone service, at a flat rate. In addition, the billing plan may provide for other services, in addition to basic telephone service, that are billable according to use, such as long distance service. Further, a caller may subscribe to one service provider for wireline calls, another service provider for wireless calls, and yet another service provider for Internet access.

In addition, a billing plan may include a credit or debit account provider. Credit and debit accounts may be specified for use according to the type of charge or debit. For example, one debit account may be specified for debits for long distance service. Another debit account may be specified for debits for personal orders placed via the telephone. Yet another debit account may be specified for debits for business orders placed via the telephone.

A debit or credit to a billing plan may include, but is not limited to, a monetary amount, a points amount, electronic coupons, electronic vouchers, and other electronic payments that may be transferred. For example, a caller may receive an electronic voucher for wireless service minutes. When the caller is charged for the minutes, the electronic voucher may automatically be redeemed.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

General Network Environment

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a-8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a-34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Identity Authentication and Call Control

Looking into PSTN 10, a telephone network typically includes multiple switches, such as central office switches 11a-11n, that originate, terminate, or tandem calls. Central office switches 11a-11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a-11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11a-11n and telco application server 22 via signaling gateway 12. In addition, a voice channel is opened between central office switches 11a-11n and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11a-11n, wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11a-11n to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11a-11n if the additional caller input is verifiable for the VID.

An origin telephony device or destination telephony device may also determine a VID and/or RVID for the caller and/or callee of a call. In particular, telephony devices 8a-8n and call centers 16a-16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a-8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a-8n.

In addition, telephony devices 8a-8n may each incorporate a display that provides a visual output of a VID or RVID. Alternatively, such a display may be provided in a separate device connected to the line in parallel to telephones 8a-8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a-8n are communicatively connected to PSTN 10 via wireline, wireless, ISDN, and other communication links. Preferably, connections to telephony devices 8a-8n provide digital transport for two-way voice grade type telephone communications and a channel transporting signaling data messages in both directions between telephony devices 8a-8n and PSTN 10.

In addition to telephony devices 8a-8n, advanced telephone systems, such as call centers 16a-16n, may be communicatively connected to PSTN 10 via wireline, wireless, ISDN and other communication links. Call centers 16a-16n may include PBX systems, hold queue systems, private network systems, and other systems that are implemented to handle distribution of calls to multiple representatives or agents.

Returning to central office switches 11a-11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a-11n. The assigned telephone number includes the area code (NPA) and exchange code (NXX) for the serving central office and four unique digits (XXXX).

Central office switches 11a-11n utilize office equipment (OE) numbers to identify specific equipment, such as physical links or circuit connections. For example, a subscriber's line might terminate on a pair of terminals on the main distribution frame of one of central office switches 11a-11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, authentication of the identity of the caller is preferably initiated in IP 17 or telco application server 22. The authentication service may attach a verification number to the authenticated VID that identifies that particular VID authorization. When the caller hangs up, the VID authorization may be discarded. A callee may only receive portions of the VID required for processing the call. For example, the VID ID may not be distributed to the callee. However, the callee may receive the verification number such that the destination device may query the authentication service to verify the VID.

Once a VID for a caller is received at one of central office switches 11a-11n, a profile for the caller is requested from SCP 15 or an external server accessible via network 20. The returned caller profile is loaded into a call register of one of central office switches 11a-11n. In particular, depending on the service provider selected in a caller profile, the call may be switched to one of central office switches 11a-11n that is associated with the service provider. Billing of services provided to the call is preferably performed according to a billing plan of the caller, rather than the billing plan of the line subscriber. In addition, services provided for the call are specified according to the service selections of the caller, rather than the service selections of the line subscriber. Also, billing for orders placed by the caller are specified according to the billing plan of the caller. In particular, the VID and caller profile may be filtered and portions of an VID may be blocked from receipt by some entities.

In addition, an RVID may be provided in the present invention to authenticate the identity of a callee receiving the call. When a call is answered, the call is transferred back to an IP or telco application server 22 to authenticate the identity of the callee answering the call.

As another alternative to dialed digits from the off-hook line terminal, a caller may utilize a voice calling function of a telephony device for indicating how the call should be routed. For example, a caller may say the name of a preferred callee. The device or IP 17 may determine a person within the caller's calling list that matches the voiced name. The matching person's digits are then utilized to route the call.

VID Authentication Context

Figure 2:
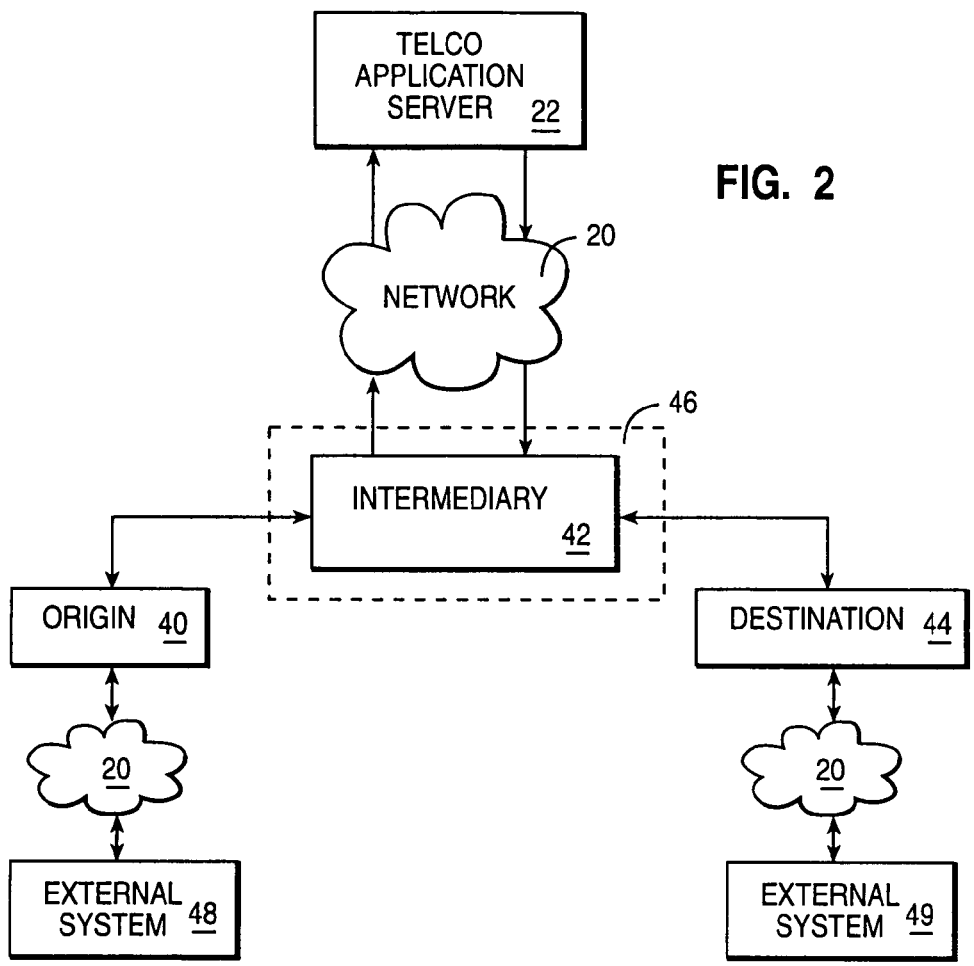
FIG. 2 illustrates a block diagram of the flow of a caller identity authentication in accordance with the method, system, and program of the present invention.

Referring now to FIG. 2, there is illustrated a block diagram of the flow of a caller identity authentication in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, in order to authenticate the identity of the caller. If there is a match between the voice utterance and a voice template, then a VID is determined for the caller and utilized to authenticate the caller identity for retrieving a caller profile and billing the caller.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

In the present invention, a VID preferably authenticates the identity of a caller. However, it is advantageous that the VID also include other information that provide a context for a call. Context for a call may be determined by a context inference engine functioning within an Intelligent peripheral of trusted telephone network 46 or within a telco application server (e.g. context inference engine 61) accessible via network 20 outside of trusted telephone network 46. In particular, the context inference engine preferably determines context from the line subscriber profile, VID, caller profile, line number, and other information accessible for a call. Types of context that may be determined for a call include, but are not limited to, the GPS location or time zone of the caller location, the billing plan for the call, the device from which the call is placed, the subject matter of the call including whether the call is personal or business related, and whether the caller is calling on behalf of another. Further, the identity of the device that performed the caller authentication may be included in a VID. The context inference engine preferably filters the context for the parties receiving the context according to caller preferences. Advantageously, a caller may specify billing preferences for billing transactions with the callee according to RVID, such that the billing preferences are filtered to specify billing specifications for that call with the callee.

A VID may be transferred in multiple protocols, including, but not limited to, Interface Definition Language (IDL). A VID may include a range of information, where each type of information may be tagged or identified in some other manner. For example, the following tagged VID may be transmitted to represent an authenticated identity of a caller:

[name] Jon Smith
[device] Jane Doe's cell phone
[location] Central Time zone
[billing plan selection] Jon's wireless provider G
[subject] Project A, business
[authenticated by] Jane Doe's cell phone (verification #4200201010), service provider G (verification #20302022202)

In another example, where the billing service filters the VID according to the call context for placing an order, the following example of a tagged VID may be transmitted:

[name] Jon Smith
[device] Jon Smith's business phone
[service billing plan selection] Business wireline provider C
[order billing plan selection] Business credit card account provider G
[subject] order for Project C
[authenticated by] service provider C (verification #2220000220)

Caller Billing Specification Context

Figure 3:
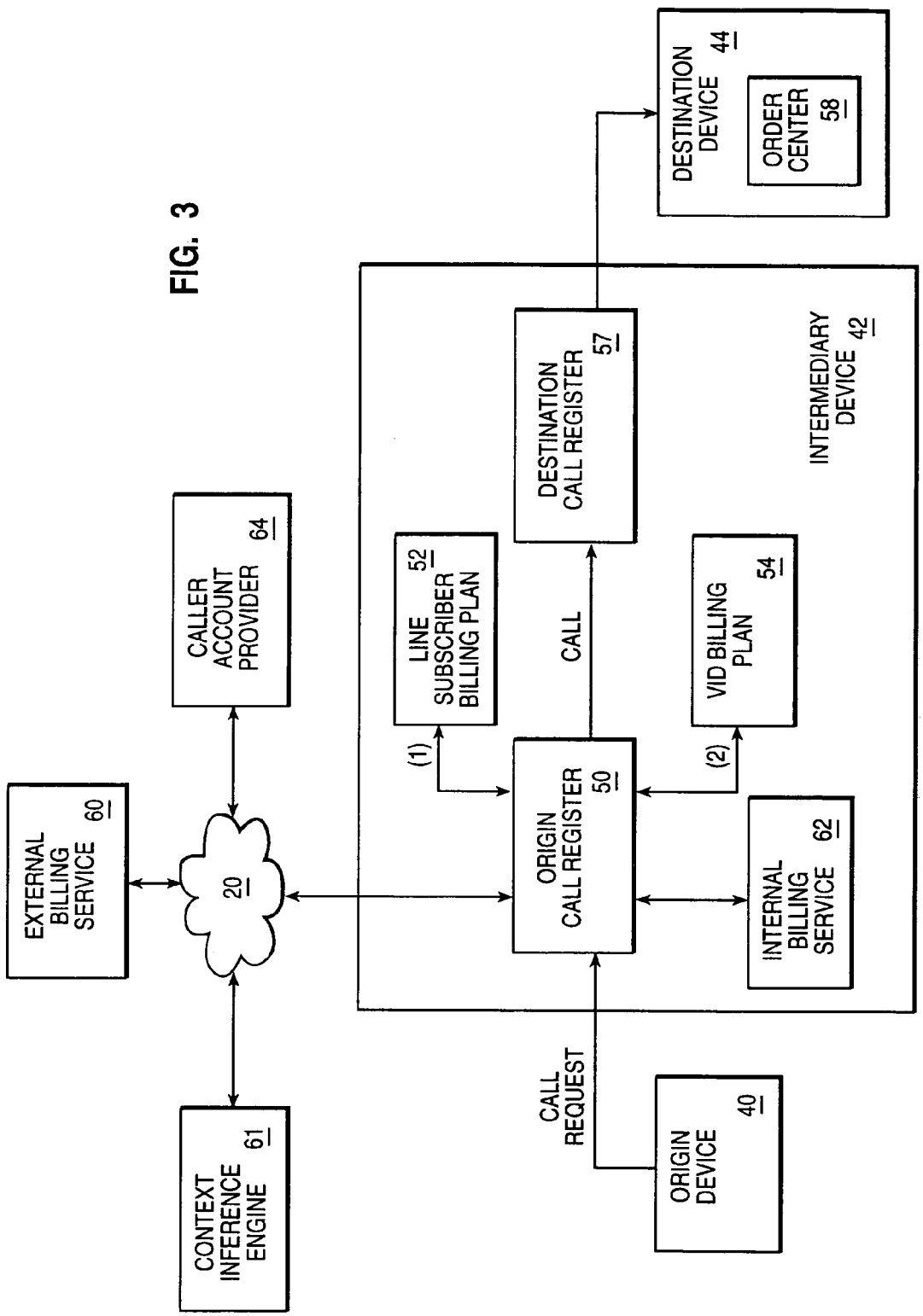
FIG. 3 depicts a block diagram of the flow of billing plans in accordance with the method, system, and program of the present invention.

With reference now to FIG. 3, there is depicted a block diagram of the flow of a billing plan in accordance with the method, system, and program of the present invention. As illustrated, origin device 40 transfers a call request to intermediary device 42. The call request may be an off-hook condition for a wireline device and a network service connection request for a wireless device.

Initially, intermediary device 42 will respond to a call request by establishing a call register 50 for the call. Next, intermediary device 42 will respond by accessing the profile for the line subscriber associated with origin device 40. In the example, the profile includes line subscriber billing plan 52 that is accessed and loaded into call register 50. Line subscriber billing plan 52 may be accessed from a database within intermediary device 42 or by accessing a database outside trusted telephone network 46.

However, once a VID is determined for the call, intermediary device 42 will respond by accessing the profile for the VID. In the example, the VID profile includes a VID billing plan 54 that is accessed and loaded into call register 50. VID billing plan 54 may replace or supplement line subscriber billing plan 52 within call register 50. The call is then processed according to the billing plans available in call register 50.

VID billing plan 54 may be accessed from a VID based caller profile stored within a database accessible within trusted telephone network 46. In addition, VID billing plan 54 may be accessed from servers external to trusted telephone network 46. In particular, a caller may choose to disclose billing information at multiple locations external to trusted telephone network 46. In addition, a caller may choose to change billing information at systems management server 28 and other servers external to trusted telephone network 46. For example, a caller may access management console 32 within systems management server 28 to update service and billing preferences according to VID. Intermediary device 42 may then access systems management server 28 to obtain billing information according to VID.

A billing service may be initiated by a service provider to handle billing of a call according to the caller's billing plan. In the example, a billing service 60 is accessible from the telco application server via network 20 outside trusted telephone network 46. In addition, a billing service 62 is accessible within trusted telephone network 46 within an Intelligent Peripheral.

In particular, a billing service may prompt a caller to indicate, from the caller's billing plan, which service provider should be utilized to handle the call and where any additional charges for the call may be incurred. The billing service may negotiate charges between service providers. In addition, the billing service may access an elected caller account provider, such as caller account provider 64, to charge the caller for services. A caller account provider may be located within or outside trusted telephone network 46. In addition, an account provider may also be a service provider or may operate independent of a service provider. For example, an account provider may manage a debit account, a credit account, or other type of account for a caller.

In addition, a billing service may negotiate payment for an order placed by the caller with a vendor according to caller's billing plan. In the example, the destination device reached by the caller via a destination call register 57 is a vendor order center 58. Vendor order center 58 may distribute the call to an interactive voice recognition unit (IVRU) or a representative for facilitating placement and verification of an order.

In particular, the vendor receives the VID and account providers from the caller billing plan. In addition, other caller profile information may indicate shipping and billing addresses. The vendor preferably loads the VID and account providers into an order form, such that the caller need only enter select an account provider to finish the order. The vendor may select one of the account providers for the form where the caller has the option to change to another account provider. In addition, in some cases only one debit account provider is available or the caller may indicate a preference for a particular account provider for orders with the vendor. Advantageously, by automatically filling in the order form, the caller need only enter or say a confirmation for the order to be processed.

Advantageously, the billing service receives the order and negotiates payment from the caller account provider according to the VID to a vendor account provider. Alternatively, the vendor account provider may directly contact the caller account provider with the VID. Either way, the caller account numbers may remain stored at the account provider and authentication of access to the account is provided by the VID. Authenticating a billing transaction according to an authenticated voice identification adds more security to a caller's account than is traditionally provided by a credit card number that any person could utilized to place orders.

According to an advantage of the present invention, the vendor may transmit the order to origin device 40 in text or other format, where origin device 40 is enabled to display the order information. From the display a caller may select from account providers, shipping addresses, and other variables by keypad, voice, or touch selection. The selections are preferably transmitted as digital signal selections to the vendor for updating the order. A caller may be interacting with a representative and/or an interactive voice recognition unit for placing the order.

According to another advantage of the present invention, where a caller requires use of a wireless service, the original service provider for origin device 40 may continue to provide the wireless service, but charge the cost of the minutes utilized, via billing service 60, to caller account provider 64, according to the VID of the caller. Caller account provider 64 may include an account of prepaid wireless minutes according to the VID that are accessed for the call.

According to further advantage of the present invention, where a caller utilizes a long distance service, the call may be transferred from the original service provider to a long distance service provider designated in VID billing plan 54. Then the long distance service provider utilize internal billing service 62, within an IP, to bill the caller according to VID for the long distance service use from origin device 40.

Figure 4:
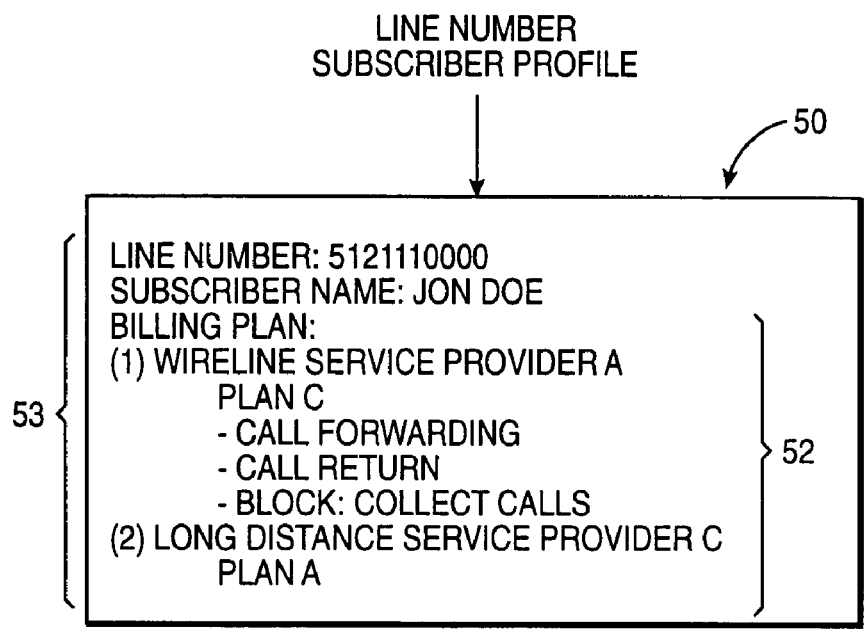
FIG. 4 illustrates an illustrative representation of the information within billing plans in accordance with the method, system, and program of the present invention.
Figure 4:
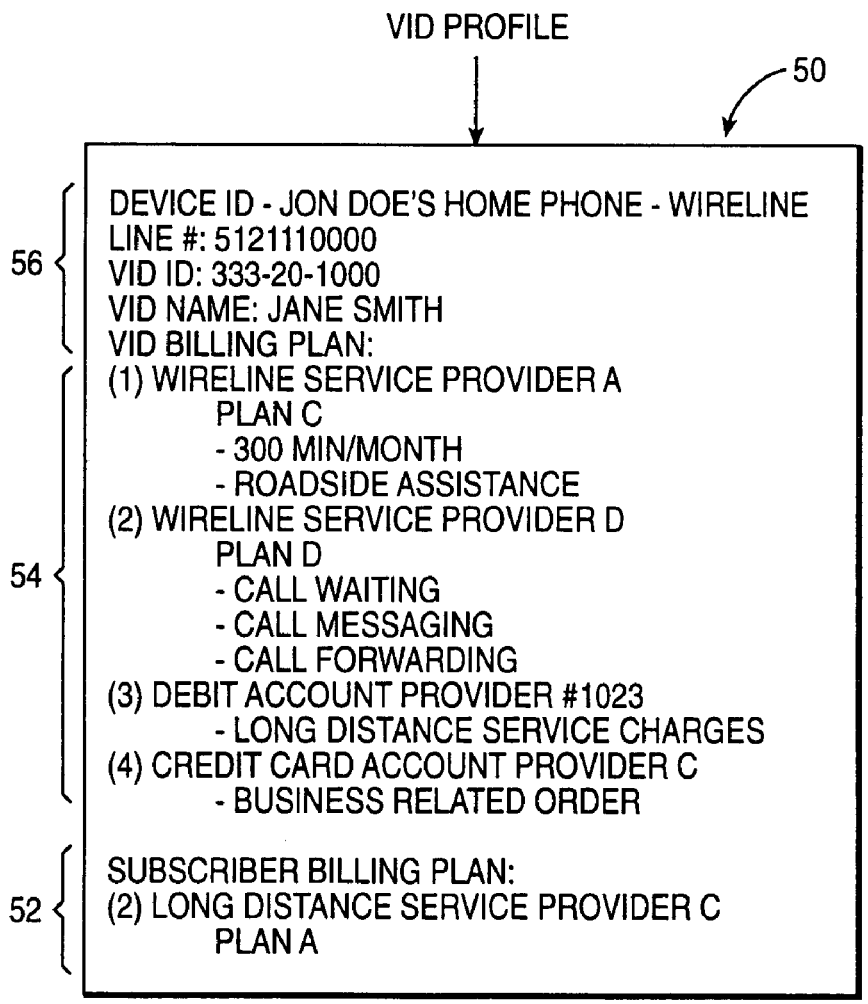

Referring now to FIG. 4, there is an illustrative representation of the information within billing plans in accordance with the method, system, and program of the present invention.

In the example, in response to a line subscriber profile request, a line subscriber profile 53 is returned and stored within call register 50. In the example, line subscriber profile 53 indicates the line number, the name of the subscriber assigned to a line number, and subscriber billing plan 52.

Subscriber billing plan 52 may include information including, but not limited to, selected service providers and other account providers. A billing plan may include one service provider utilized for general wireline service and another service provider utilized for long distance service. Further, a billing plan may include other account providers, such as a debit account provider for charging for use of a call return service. Charges may be distributed to each of the service providers and account providers depending on the type of charge and the type of account.

According to an advantage of the present invention, when a VID for a caller is determined, a VID profile may be accessed, including VID billing plan 54. VID billing plan 54 may supplement or replace the billing information for a call currently in call register 50. In the example, the billing information for the VID supplements the billing information for the line subscriber, such that service provided to the caller is billed to the caller. Advantageously, billing information for the line subscriber and the VID may both remain in call register 50, where a billing service negotiates payment from VID billing plan 54 to the line subscriber billing plan 52. Alternatively, VID billing plan 54 may completely replace line subscriber billing plan 52.

In addition to billing information, VID and context information 56 may also be loaded into call register 50. In the example, VID and context information 56 includes a VID ID, a VID name, the line number, and an identifier for the device. In alternate embodiments, additional billing, VID, and call context information may be included in call register 50. In particular, where the origin line subscriber and the caller are the same person, it is still advantageous to supplement call register 50 with VID and context information 56.

In the present example, VID billing plan 54 indicates the providers selected by the caller. First, a wireless service provider is elected under a "Plan C" offered by the wireless service provider. "Plan C" may include, for example, a certain number of minutes per month at a flat rate. Preferably, those minutes are available to the caller at any wireless device accessible to the caller. In addition, "Plan C" may indicate individual service selections, such as roadside assistance. According to an advantage of the present invention, a caller is not limited to the caller's wireless device for requesting a roadside assistance service provided by a wireless service provider.

Next, a wireline service provider is elected, where the wireline service is provided according to "Plan D". "Plan D" may include, for example, a flat rate per month of use of wireline devices and several services selected by the caller. In this example, the caller has selected call waiting, call messaging, and call forwarding, to be provided under "Plan D".

Further, in the example, a debit account provider is selected, where the debit account is established to pay for long distance service charges. The long distance service provider selected in line subscriber billing plan 52 is utilized to provide long distance service, but a billing service directs charges for that long distance service to the debit account provider, rather than charging the line subscriber. Alternatively, a caller may select a long distance service provider that replaces the long distance service provider selected by the line subscriber.

Additionally, a credit card account provider is selected, where the credit card account is designated for charges incurred for orders placed during the call. The caller is not required to reenter billing information for each different vendor at which an order is placed. In addition, the caller is not required to disclose account numbers, just the account provider, where the authenticated VID provides the authentication for accessing the caller account at the account provider. In particular, only portions of a caller VID, such as the caller name, account provider and shipping address may be provided to the vendor, however the other portions of the VID may be accessible to the billing service with the order to maintain the security of the VID.

According to one advantage of the present invention, an origin device is not limited to the services elected by the line subscriber. In addition, billing for use of a line number is not limited to billing the line subscriber, particularly where use of a line number is billed per minute or per service provided. Further, the caller's account numbers are not required for billing the caller.

In particular, where the billable service billed for is long distance service, the present invention is advantageous in that the caller is only required to provide a voice utterance and the central office can load the caller's profile, including billing information and service choices, for use in processing the call and billing the caller.

The present invention is distinct from traditional long distance service because traditional long distance service requires election of a single long distance service provider for a line number, where a line subscriber is billed for all long distance calls made from the line number. According to the present invention, the billing plan for a line number is selected according to the billing plan of a caller utilizing the line number at an origin device. The central office replaces or supplements the service and billing plan identified in a call register according to a caller profile associated with the authenticated caller identity.

Figure 5:
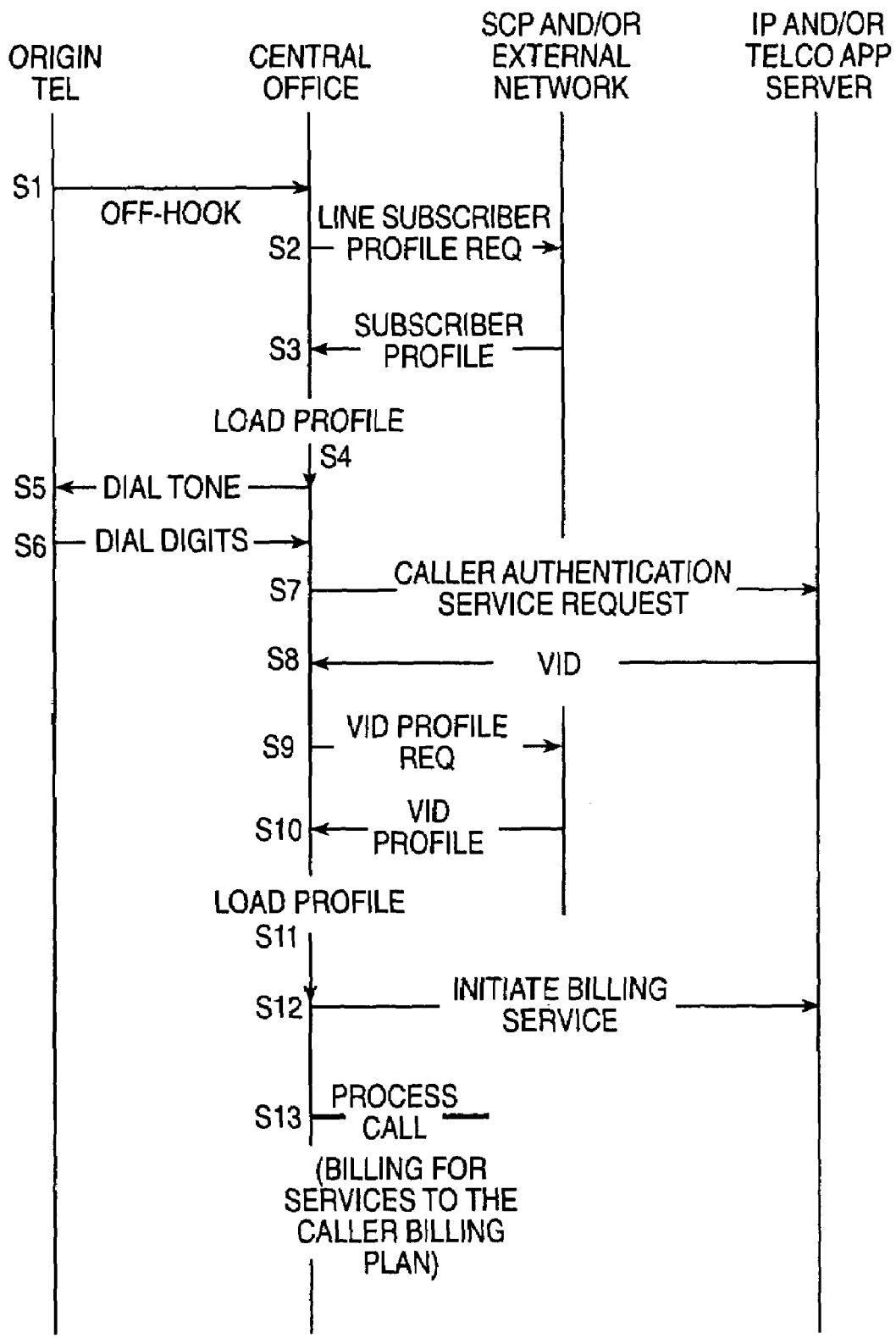
FIG. 5 depicts a flow diagram of a signal flow and processing of a call in accordance with the method, system, and program of the present invention.

With reference now to FIG. 5, there is depicted a flow diagram of a signal flow and processing of a call in accordance with the method, system, and program of the present invention. A standard telephone device is assumed for the "tel" origin device in the present example. However, a similar signal flow may be applied to other types of origin devices.

The caller lifts a handset creating an off-hook state in the origin device and a corresponding change in state of an off-hook signal to the central office (step S1). In response to detecting an off-hook state in the origin device, the central office establishes a register for the call and requests a line subscriber profile from the SCP and/or an external network server (step S2). A line subscriber profile including preferred services and a billing plan is returned to the central office (step S3). The central office loads the line subscriber profile into the call register (step S4) and extends a dial tone to the origin device (step S5).

The origin device then transmits dialed digits to the central office (step S6). A caller may utilize a keypad to enter a telephone number or utilize a voice dial feature if available. Dialed digits may be received at other points in the process and loaded into the call register until needed for processing the call.

Next, the central office extends a caller authentication service request to an IP or to the telco application server (step S7). The caller authentication server will prompt a caller to provide a voice utterance, match the voice utterance with a voice template and authenticate the caller identity as a VID which is returned to the central office (step S8). Alternatively, the origin device or destination device may perform caller authentication, where the VID is received from the origin device or destination device.

The central office updates the call register with the VID and extends a request for a VID based profile to the SCP and/or external network servers (step S9). The VID based profile is returned from locations where the caller has selected to make VID based information available (step S10). The central office then loads the VID based profile, including a billing plan, into the call register (step S11). The central office may then initiate a billing service within an IP or telco application server, to monitor billable charges, charge the caller account at a service provider or at another account provider, and negotiate between service providers, if needed (step S12). In addition, the central office may switch the call from one service provider to another service provider specified in the caller billing plan.

The call is then processed to facilitate communications between the origin device and a destination device accessed in association with the dialed digits (step S13). In particular, processing the call also includes providing services designated in the VID based caller profile and billing for services according to the caller billing plan.

Figure 6:
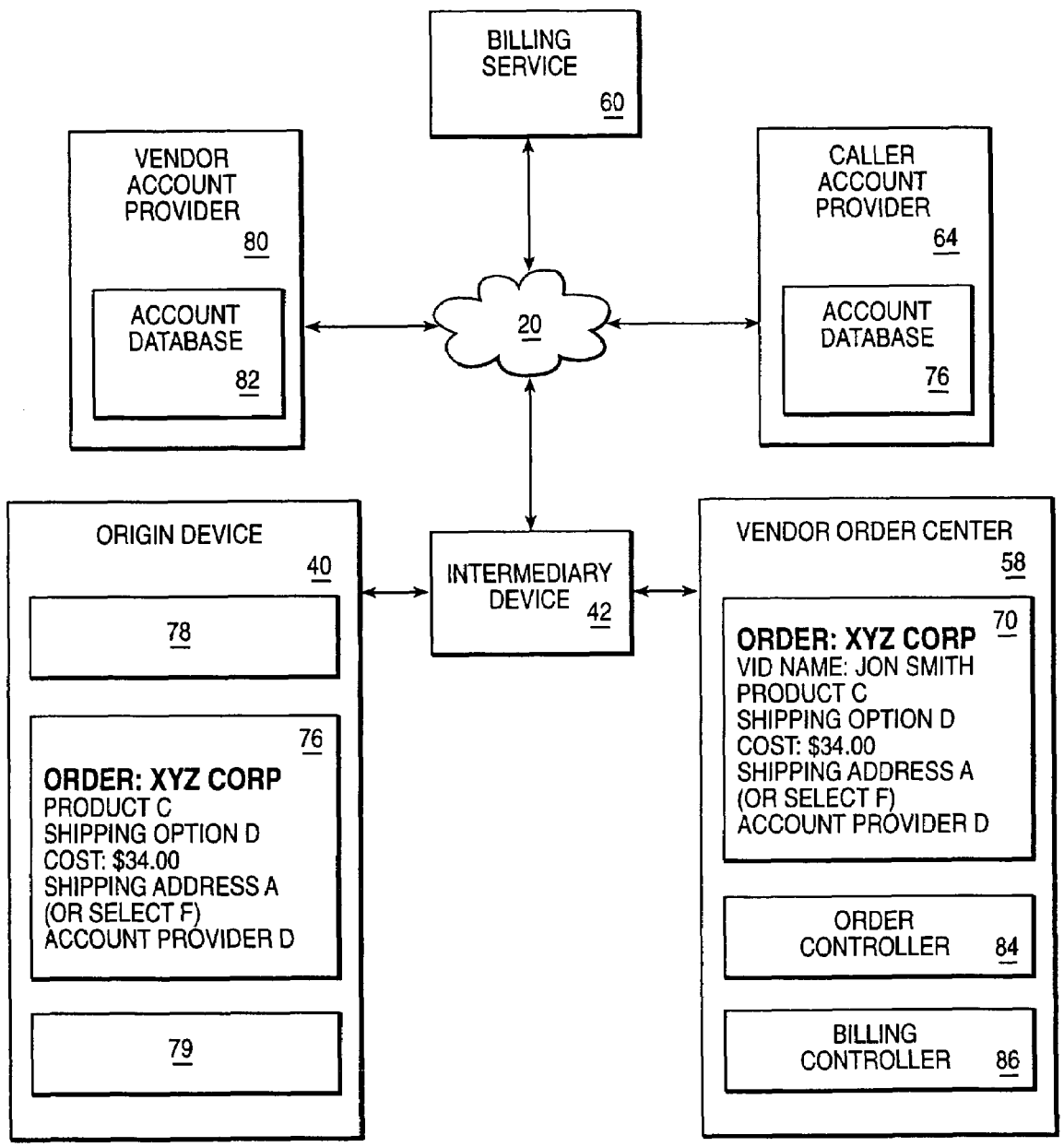
FIG. 6 illustrates an illustrative embodiment of a telephone based order in accordance with the method, system, and program of the present invention.

Referring now to FIG. 6, there is illustrated an illustrative embodiment of a telephone based order in accordance with the method, system, and program of the present invention. As depicted, vendor order center 58 is in communication with origin device 40, utilized by a caller identified by a VID.

In the example, the caller has placed an order from the vendor for product C. The caller name, product specification, shipping address, and account provider are loaded into the order form 70. A text or voice automated version of order form 70 may be transmitted to origin device 40.

According to an advantage of the present invention, as previously described, the context for a call may be determined by a context inference engine and forwarded to vendor order center 58 and billing service 60. The context for the call may be utilized to filter a billing plan to determine the most likely selections by the caller for the order.

An advantage of obtaining context for a call is that the context may indicate whether the call is personal or business based. If the call is personal, then a personal billing address and personal account provider may be selected automatically. If the call is business, then a business billing address and business account provider may be selected automatically by an order controller 84 within vendor order center 58 or billing service 60.

In addition, context may include scheduling information which may indicate a date by which an ordered product or service is needed. For example, if the schedule indicates a wedding date and the order is for a wedding gift, then the context indicates the number of days available for shipping. Vendor order center 58 or billing service 60 may select a shipping option that meets the target date. On a similar note, the caller profile may indicate that the caller prefers a gift wrapping service if available, such that vendor order center 58 may automatically add gift wrapping to an order if the service is available.

In particular, where multiple options are available for an entry within order form 70, vendor order center 58 may fill in the entry with the most likely caller selection. The order form transferred to the caller preferably includes the most likely selections, but provides the caller with the option to change that selection to one of the others included in the billing plan. By automatically filling in order form 70, the check-out process may be expedited. In particular, the caller is preferably provided the option to enter a single verification/authorization to complete the order during the check-out process.

Origin device 40 preferably includes a graphical user interface 76 for graphical output of the text from order form 70. Alternatively, origin device 40 preferably includes an earpiece 78 comprising a speaker through which a voice automated version of order form 70 may be output.

The caller may provide inputs via keypad entry, voice entry or touch entry, such as with a stylus. In particular, the order received at origin device 40 is filled in with selections from the caller billing plan and caller profile. However, the caller may select from other options in the caller billing plan to change the form.

Where the caller does not have changes to the selections made for the order, the caller preferably verifies the order during the check-out process by a single entry. The single entry may comprise a keypad entry, a voice entry via microphone 79 or a stylus touch entry. The entry preferably verifies that an order is correct and may be processed.

Once the order is confirmed by the caller, billing controller 86 coordinates transmission of the order to billing service 60 with the VID. In particular, while the VID provided to vendor order center 58 is filtered to only show the caller's name, billing service 60 may be authorized to receive more portions of the VID than vendor order center 58.

Billing service 60 preferably accesses caller account provider 64 with the VID name, VID ID, VID verification number, charge amount and order information. Caller account provider 64 preferably includes an account database 76 that includes account numbers, balances, and transactions histories stored according to VID. Caller account provider 64 preferably renders a payment for the order to billing service 60. Billing service 60 then routes the payment to a vendor account provider 80, where vendor account provider 80 include an account database 82 of account numbers, balances, and transactions stored according to vendor ID. Accordingly, payer and payee account information is protected from any entity except billing service 60, which is preferably a secure service.

It should be noted that while the present invention is described with reference to vendor order center 58 as a call center for controlling orders from a business entity, that business entity may be any size from a single individual to a multinational corporation. In addition, vendor order center 58 may access a plurality of terminals or a single destination device terminal. Moreover, order controller 84 preferably controls automatically filling in billing related information into order form 70, but an IVRU or a representative may prompt the caller for the products and services to be ordered.

Further, it should be noted that while the present invention is described with reference to billing a caller for payment of an order placed via telephone, all other money transactions between entities initiated by a telephone call are incorporated into the present invention.

Moreover, it should be noted that while the present invention is described with reference to billing a caller for an order, the vendor order center may also offer deals where a caller signs up for a service and in return receives points, vouchers, electronic coupons, or other payments of value. In this case, billing service 60 also negotiates payment from the vendor account provider to the caller account provider, where the same or different account providers may be utilized for the charge to the caller and the charge to the vendor.

Figure 7:
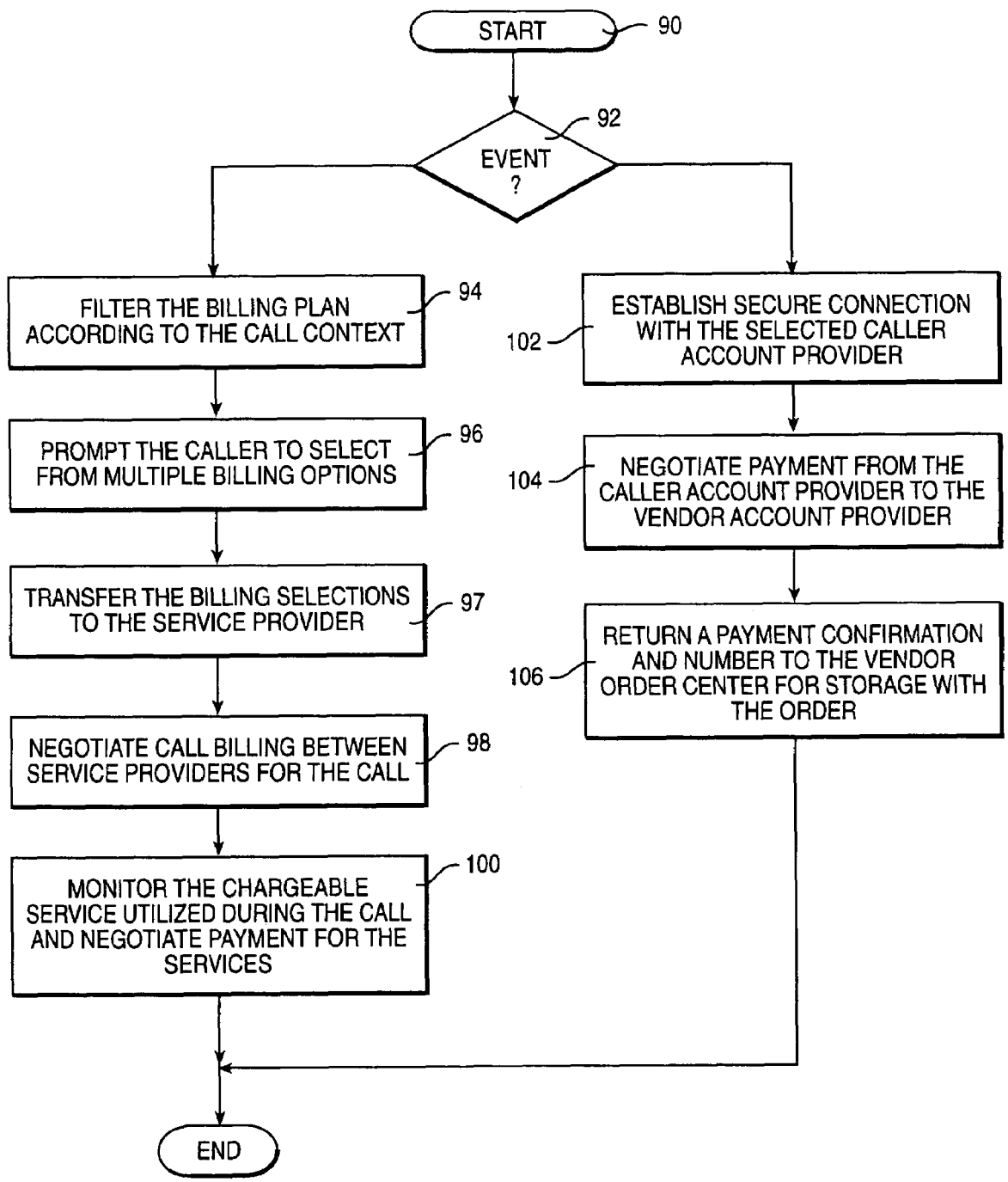
FIG. 7 depicts a high level logic flowchart of a process and program for controlling a billing service in accordance with the method, system, and program of the present invention.

Referring now to FIG. 7, there is depicted a high level logic flowchart of a process and program for controlling a billing service in accordance with the method, system, and program of the present invention. As illustrated. As illustrated, the process starts at block 90 and thereafter proceeds to block 92. Block 92 depicts a determination as to what event occurred when an event occurs. If a VID/billing plan are received for a new call, then the process passes to block 94. If an order is received, then the process passes to block 102.

Block 94 depicts filtering the caller billing plan according to the call context. Next, block 96 illustrates prompting the caller to select from multiple options in the billing plan after filtering. For example, if the caller has multiple wireless providers for a wireless call, then the caller may be prompted to select one wireless provider for providing telephone services for the call. Thereafter, block 97 depicts transferring the billing selections to the current service provider, such that the call may be switched to the selected service provider or remain at the current service provider but charge the selected service provider account. In particular, block 98 illustrates negotiating billing between service providers for the call, when needed. Next, block 100 illustrates monitoring chargeable service utilized during the call and negotiating payment for those services from the caller account providers.

Block 102 depicts establishing a secure connection with the caller account provider selected in an order. If more than one caller account provider is selected for an order for split billing, then multiple caller account providers may be contacted. Next, block 104 illustrates negotiating payment from the caller account provider to a vendor account provider. Thereafter, block 106 depicts returning an payment number and confirmation to the vendor order center, and the process ends.

Figure 8:
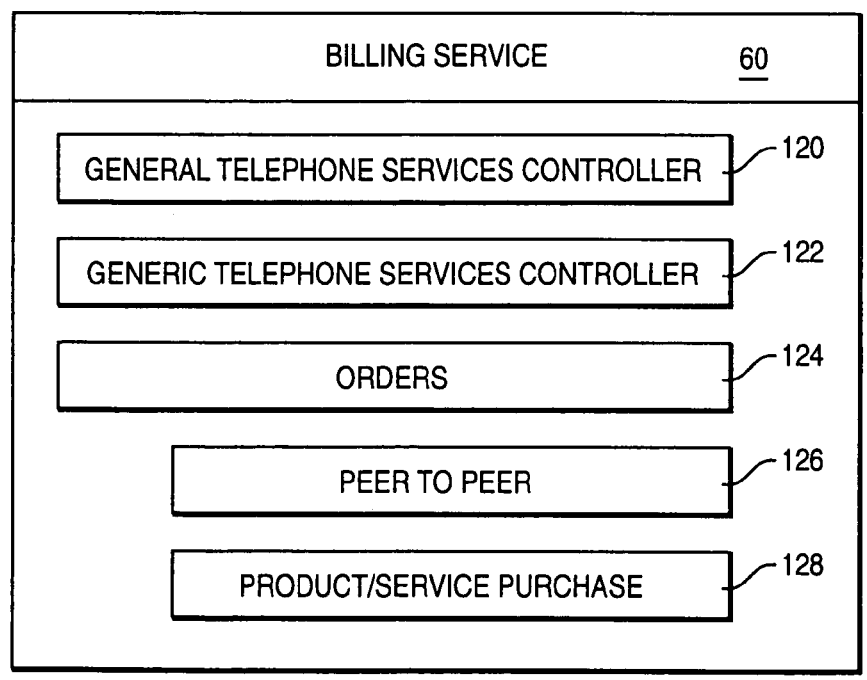
FIG. 8 illustrates a block diagram of the billing service in accordance with the method, system, and program of the present invention.

With reference now to FIG. 8, there is illustrated a block diagram of the billing service in accordance with the method, system, and program of the present invention. As depicted, billing service 60 preferably includes multiple selectable service controllers. The billing service preferably captures the caller VID and callee RVID to facilitate transactions.

For controlling billing for general telephone services, general telephone service controller 120 is initiated. General telephone service controller 120 preferably determines the service provider for a call and coordinates transfer of the call to that service provider or payment to the current service provider.

For controlling billing for billable telephone services, such as long distance service, generic telephone service controller 122 is initiated. Generic telephone service controller 122 preferably monitors billable services during a call and negotiates payment for those services by a caller account provider.

For controlling other financial transaction orders, callers may request different order services from among order services 124. Any of order services 124 may be initiated by a caller or callee.

In particular, a peer-to-peer service 126 preferably processes an order for a shift in financial funds from the caller to the callee, initiated by either the caller or callee. Peer-to-peer service 126 may prompt the caller to provide the transfer amount and select an account provider and prompt the callee to select an account provider.

In addition, a product/service purchase service 128 processes an order for a payment from the caller for a product or service purchased from the callee. Product/service purchase service 128 preferably receives account provider selections and an order amount and description to facilitate the transaction.

While the present invention has been described with reference to billing a single caller account provider, in alternate embodiments, multiple callers may be billed during a call. For example, where a caller places a call to a pizza delivery business and orders a pizza, any colleagues who are willing to split the price of the pizza preferably log onto the call with a voice identification and indicate the percentage of the bill to be charged. With such a system, the pizza delivery business does not need to split the bill and request multiple charges because product purchase service 128 automatically calculates each caller's percentage of the bill and facilitates the transaction, such that the pizza delivery account provider just receives one payment transaction for the purchase price of the pizza.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for controlling telephone orders, comprising: receiving a billing plan for an authenticated caller identifier of a caller during a call placed to a vendor order center, wherein at least one account provider is specified in said billing plan; specifying an order with a selection of one from among said at least one account provider specified for billing for said order; receiving an authorization from said caller for said order; transferring a bill for said order according to said authenticated caller identifier and said authorization for said selection of one from among said at least one account provider, such that said vendor order center is enabled to bill for said order with limited account information.

2. The method for controlling telephone orders according to claim 1, wherein said at least one account provider comprises at least one from among a credit account provider, a debit account provider, and a savings account provider.

3. The method for controlling telephone orders according to claim 1, wherein said authenticated caller identifier comprises a caller name.

4. The method for controlling telephone orders according to claim 1, wherein said at least one account provider is specified for a context of said call.

5. The method for controlling telephone orders according to claim 1, wherein said billing plan further comprises at least one shipping address.

6. The method for controlling telephone orders according to claim 1, wherein specifying an order further comprises: automatically specifying said selection of one from among at least one account provider where one account provider is provided.

7. The method for controlling telephone orders according to claim 1, further comprising: specifying said selection of one from among at least one account provider according to a selection by said caller.

8. The method for controlling telephone orders according to claim 1, further comprising: selecting a first account provider for billing for said order; and only adjusting said selection if said caller requests selection options of another account provider.

9. The method for controlling telephone orders according to claim 1, wherein receiving an authorization comprises receiving a keypad authorization entry by said call from an origin device.

10. The method for controlling telephone orders according to claim 1, wherein receiving an authorization comprises receiving a voice authorization entry by said call from an origin device.

11. The method for controlling telephone orders according to claim 1, wherein receiving an authorization comprises receiving a touch selection authorization entry by said call from an origin device.

12. The method for controlling telephone orders according to claim 1, wherein transferring a bill further comprises: transferring said bill to said selection of one from among said at least one account provider.

13. The method for controlling telephone orders according to claim 1, wherein transferring a bill further comprises: transferring said bill to a billing service enabled to negotiate payment from said selection of one from among said at least one account provider to a vendor account provider.

14. The method for controlling telephone orders according to claim 1, wherein said vendor ordering center comprises a single terminal.

15. The method for controlling telephone orders according to claim 1, wherein said vendor ordering center comprises a call center enabled with an interactive voice recognition unit for facilitating order placement.

16. The method for controlling telephone orders according to claim 1, wherein said vendor ordering center comprises a call center managing a plurality of representatives.

* * * * *